(12) United States Patent  
Ducoulombier et al.

(10) Patent No.: US 7,677,018 B2  
(45) Date of Patent: Mar. 16, 2010

(54) BELT TENSIONING SYSTEM FOR A FORAGE HARVESTER

(75) Inventors: André S. N. C. Ducoulombier, Wevelgem (BE); Daniël M. G. Van Overschelde, Torhout (BE)

(73) Assignee: CNH America LLC, New Holland, PA (US)

( * ) Notice: Subject to any disclaimer, the term of this patent is extended or adjusted under 35 U.S.C. 154(b) by 605 days.

(21) Appl. No.: 11/605,562

(22) Filed: Nov. 28, 2006

(65) Prior Publication Data

US 2007/0125055 A1 Jun. 7, 2007

(30) Foreign Application Priority Data

Dec. 1, 2005 (GB) .................................. 0524417.3

(51) Int. Cl.  
*A01D 69/08* (2006.01)

(52) U.S. Cl. .................................................... 56/11.6

(58) Field of Classification Search .................. 56/10.8, 56/13.3, 13.4, 11.6, 16.4 R, 16.6, DIG. 4, 56/DIG. 5; 474/115

See application file for complete search history.

(56) References Cited

U.S. PATENT DOCUMENTS

| | | | | |
|---|---|---|---|---|
| 1,368,014 A | * | 2/1921 | Bauert et al. | 56/127 |
| 3,657,865 A | * | 4/1972 | Ober | 56/13.3 |
| 4,566,256 A | * | 1/1986 | Sousek | 56/10.2 R |
| 5,012,632 A | * | 5/1991 | Kuhn et al. | 56/11.6 |
| 5,286,233 A | * | 2/1994 | Engelstad et al. | 474/101 |
| 6,334,292 B1 | * | 1/2002 | Walch et al. | 56/11.6 |
| 7,553,248 B2 | * | 6/2009 | Busboom et al. | 474/134 |

FOREIGN PATENT DOCUMENTS

EP 1 358 788 A 5/2003

* cited by examiner

*Primary Examiner*—Alicia M Torres  
(74) *Attorney, Agent, or Firm*—Michael G. Harms; John William Stader; Patrick M. Sheldrake

(57) ABSTRACT

A tensioning system for a drive belt of a blower of a forage harvester includes a tensioning roller, a rod for moving the tensioning roller towards and away from the belt, a spring surrounding the rod and acting between a first abutment mounted on the rod and a second abutment connected to the chassis of the harvester to urge the roller towards the belt. The chassis connected abutment is carried by an arm that is movable relative to the chassis and anchored by a tie bar.

6 Claims, 3 Drawing Sheets

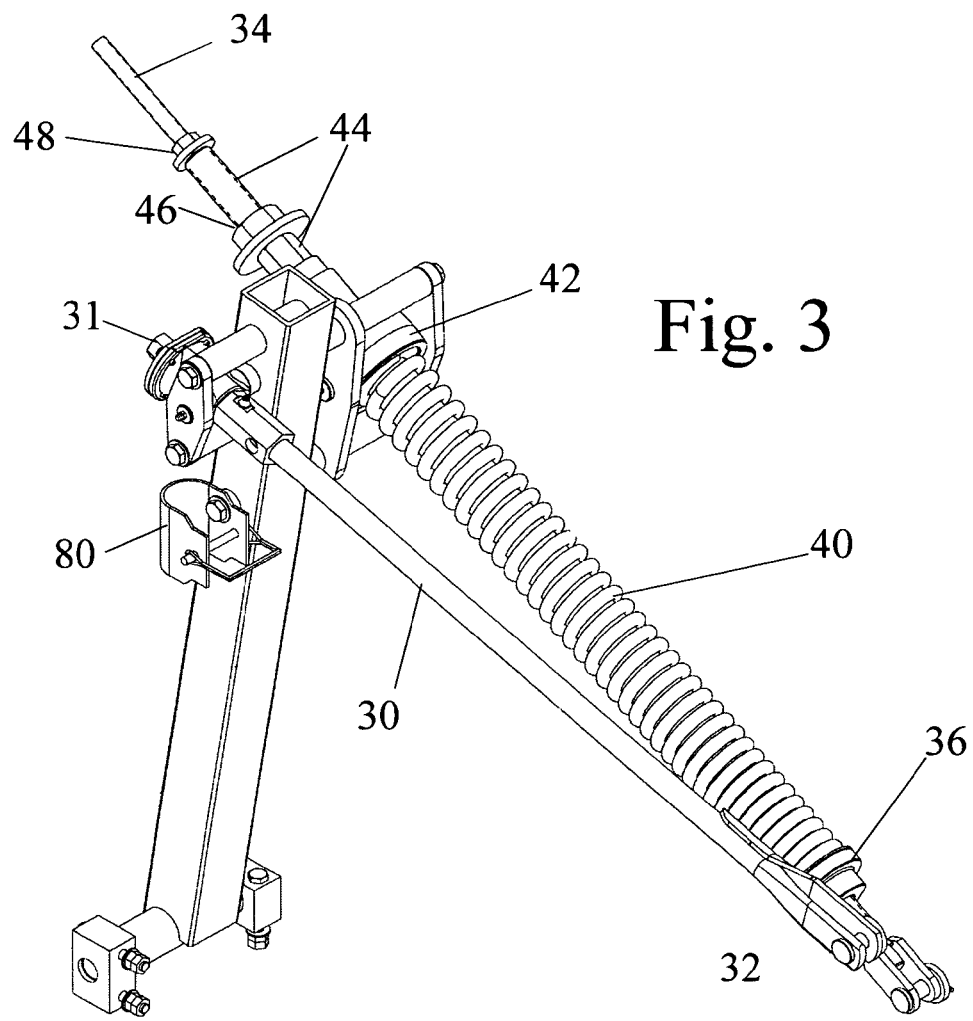
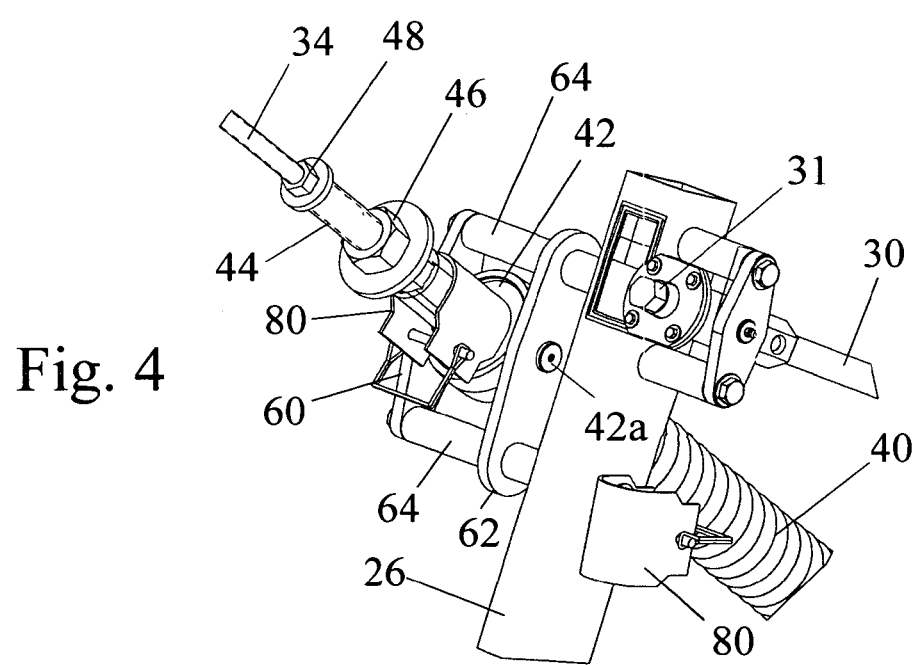

BELT TENSIONING SYSTEM FOR A FORAGE HARVESTER

FIELD OF THE INVENTION

This invention relates to a belt tensioning system for a forage harvester.

BACKGROUND OF THE INVENTION

Forage harvesters are machines which chop crop gathered from a field into small pieces to produce animal feed. In the case of crops such as grass or alfalfa, these will have been pre-cut and left to dry in the sun, so that the crop need only be gathered by the harvester. With other crops, such as maize, the forage harvester may also be required to cut the crop. Thus, the harvesters may be fitted with different headers to suit the crop being harvested.

The crop, whether cut maize or gathered grass, is fed into a rotating knife drum or cutter which comminutes the product. With grass crops, this alone is sufficient to produce the desired forage. However, when harvesting maize for silage purposes, the cutting alone does not suffice due to the presence of kernels in the crop. The kernels need to be cracked in order to release the nutrient, as uncracked kernels are hard for animals to digest. As cutting alone is insufficient to crack all the kernels, the crop is additionally passed through a crop processor which comprises two closely adjacent rollers, typically having serrated surfaces, which rotate such that there is slippage between the adjacent surfaces. The gap between the rollers is set to suit the size of grain passing through and the speed, rotational energy of the rollers, relative movement and serration of the surfaces together ensure cracking of any kernels that are still intact after chopping by the cutter.

The momentum of the maize from the crop processor or the grass from the cutter, as the case may be, carries the crop into a blower which then propels it up a tower to a discharge spout through which it is discharged into a wagon or a trailer drawn by a separate vehicle driven alongside the harvester.

When chopping kernel-free crops, such as grass or alfalfa, the crop processor is not required and leaving it in place in the crop flow path results in its rollers being unnecessarily subjected to wear.

To avoid such wear, it has previously been proposed to remove the crop processor from the vehicle, but the size and weight of the crop processor make this a difficult and cumbersome task.

Another solution, disclosed in GB 2 414 373, is to pivot the crop processor away from its operative position in the crop path but to leave it on the vehicle in an inoperative position. In GB 2 414 373, in order to avoid blockages, the blower and the crop processor are connected to a common pivot frame so that as the crop processor is withdrawn from the crop flow path, the blower moves downwards to take its place.

Because the drive pulley of the blower needs to move between two different positions, a tensioning roller is required for the belt which transmits drive to the blower from the engine and the present invention seeks to provide a suitable belt tensioning system that is simple to install and to set up correctly.

SUMMARY OF THE INVENTION

According to the present invention, there is provided a tensioning system for a drive belt of a blower of a forage harvester, comprising a tensioning roller, a rod for moving the tensioning roller towards and away from the belt, a spring surrounding the rod and acting between a first abutment mounted on the rod and a second abutment connected to the chassis of the harvester to urge the roller towards the belt, characterised in that the abutment connected to the chassis is carried by an arm that is movable relative to the chassis and anchored by means of a tie bar.

Preferably, the arm carrying the second abutment is pivotably mounted on the chassis of the harvester.

In the preferred embodiment of the invention, the tie bar is of adjustable length to enable the belt to be loosened by varying the length of the tie bar.

If the end of the tie bar remote from the pivotable arm is secured to the pivot frame that serves to mount the blower on the chassis of the harvester, then it is possible by suitable selection of the geometry of the pivotable arm and the tie bar to ensure that the drive belt of the blower is correctly tensioned in the different operative positions of the blower, so as to avoid the need for readjustment.

It is desirable for the first abutment on the tensioning rod to be defined by a tube which is disposed within the spring and which surrounds and is in threaded engagement with the rod, the position of the first abutment being adjustable by rotating the tube relative to the tensioning rod.

The second abutment is advantageously formed by a collar slidable over the outer surface of the tube and secured to the movable arm.

Advantageously, a portion of the tube extending beyond the slidable collar is externally screw threaded and engaged by a nut to enable the spring to be held in compression on the tube prior to the tube being fitted as a sub-assembly over the tensioning rod.

The invention further provides a method for tensioning a belt by using a tensioning system as set forth above, which comprises the steps of mounting the rod and the spring between the movable arm and the tensioning roller, moving the arm by varying the length of the tie bar and simultaneously placing the tensioning roller onto the belt to achieve an initial setting of the spring tension to the belt and moving the first abutment on the rod relative to the second abutment on the movable arm while simultaneously moving the rod with the tensioning roller to the belt to achieve a final setting of the spring tension by the tensioning roller to the belt.

The invention further provides a method for releasing the tension on a belt by using a tensioning system as set forth in claim 7 of the appended claims, which comprises the steps of moving the second abutment on the movable arm relative to the first abutment until the second abutment contacts the nut by varying the length of the tie bar and moving the arm together with the rod, the spring and tensioning roller by continuing to vary the length of the tie bar.

In the preferred embodiment of the invention, an element may be placed between the second abutment and a washer of the nut to limit the distance over which the tie bar needs to be varied against the force of the spring.

The invention further provides a method for re-tensioning the tension on a belt by using a tensioning system as set forth above which comprises the steps of moving the arm together with the rod, pre-assembly unit and tensioning roller by varying the length of the tie bar, and moving the second abutment on the movable arm relative to the first abutment by a continued varying of the length of the tie bar until the position of the tensioning roller on the belt prior to releasing is attained.

BRIEF DESCRIPTION OF THE DRAWINGS

The invention will now be described further, by way of example, with reference to the accompanying drawings, in which:

FIG. 3 shows a perspective view from one side of the belt tensioning system of FIG. 2, FIG. 4 is a partial perspective view from the other side of the belt tensioning system of FIGS. 2 and 3.

DETAILED DESCRIPTION OF THE PREFERRED EMBODIMENTS

Figure 1:
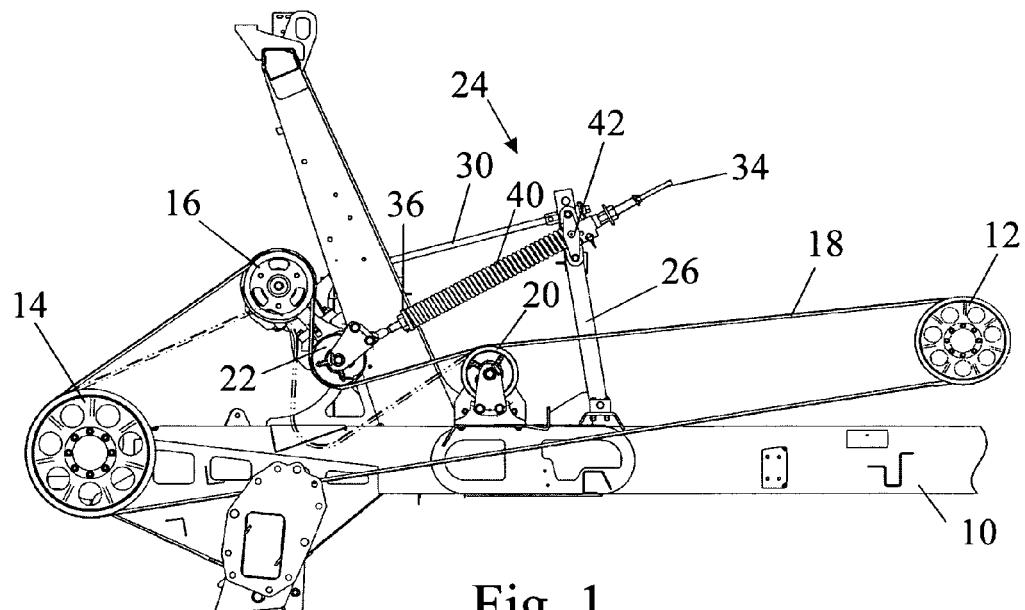
FIG. 1 is a schematic representation of a belt driving the blower of a forage harvester and tensioned by a tensioning system of the invention.

FIG. 1 shows part of the chassis 10 of a forage harvester on which there is mounted an engine driving a pulley 12, a cutter driven by a pulley 14 and a blower driven by a pulley 16. The engine, cutter and blower are not shown in the drawing but reference may be made to GB 2 414 373 for a fuller description of the harvester.

The blower and the cutter are driven by a belt 18 which also passes over an idler roller 20 and a tensioning roller 22. Because the blower pulley 16 can move between two different positions (for the reasons explained previously), a tensioning system 24 is required that is capable of maintaining the belt 18 correctly tensioned in both positions of the pulley 16 and when the blower and pulley 16 are moving between these two positions.

The tensioning system of the invention is shown in greater detail in FIGS. 2 to 6. The roller 22 is mounted on the end of a spring biased tensioning rod 34. The rod 34 carries a first abutment 36 for a spring 40 which surrounds the rod 34. The other end of the spring 40 acts against a second abutment 42 which is connected to the chassis 10 of the forage harvester.

Conventionally, the second abutment cannot move relative to the chassis and installation involves fitting the spring over the rod, adjusting the position of the rod in the second abutment and the position of the abutment on the rod until the desired tension is achieved. This is a very tiring and time consuming procedure and requires space for the tools needed to achieve the correct tensioning.

In the illustrated embodiment of the invention, the second abutment is formed by a collar 42 mounted on an arm 26 which is pivoted about a pin 28 relative to the chassis 10. The collar 42 lies on one side of the arm 26 and its other side is secured by a tie bar 30 of adjustable length to a pin 32 mounted on the pivot frame carrying the blower. The tie bar 30 is formed by two parts in threaded engagement with one another, so that its length can be adjusted by turning a nut 31.

The abutment 36 is defined by a flange at the end of a tube 38 which surrounds the tensioning rod 34. The tube 38 has inserts at each of its two ends, the abutment 36 may be formed by a flange of one of these two inserts, which is in threaded engagement with the tensioning rod 34.

Figure 6:
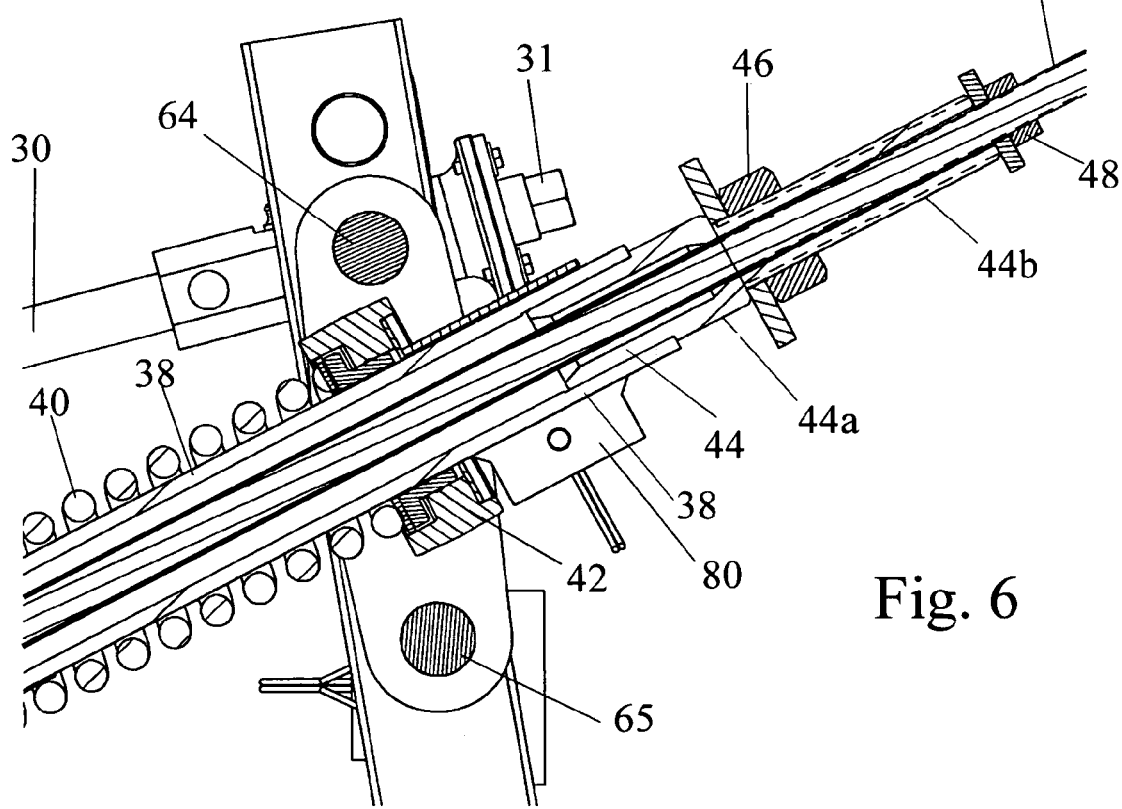
FIG. 6 shows the detail of FIG. 2 within the chain-dotted frame 70 drawn to an enlarged scale.

The insert 44 at the opposite end of the tube 38, as more clearly shown in FIG. 6, has a head 44a which is hexagonal to enable it to be gripped by means of a spanner. Beyond the hexagonal head 44a there is a sleeve 44b which is threaded both internally and externally. A locknut 48 serves to prevent rotation of the sleeve 44b and with it the tube 38 relative to the rod 34 once the spring tension has been correctly set. A second nut and washer 46 screwed onto the external thread of the sleeve 44b serve as an end stop to allow the spring 40 to be retained and tensioned about the tube 38 prior to its installation over the rod 34. This allows the spring 40 and tube 38 to be fitted as a sub-assembly over the rod 34, thus saving time and effort during the installation.

Figure 5:
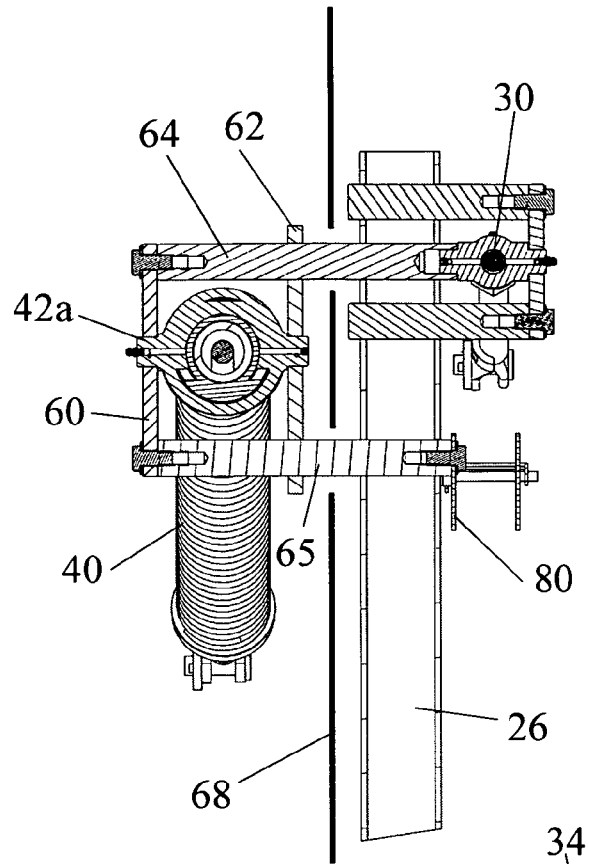
FIG. 5 is a section along the line V-V in FIG. 2.

The collar 42 that acts as the second abutment for the spring 40, is constructed as swivel that is free to pivot about pins 42a (see FIG. 5) between two plates 60 and 62 mounted on rods 64 and 65 that project laterally from the pivotable arm 26. The plate 60 is removable to allow the collar 42 to be secured to and separated from the pivotable arm 26. The tie bar 30 is held in a similar manner in a swivel on the opposite side of the pivotable arm 26 and is connected through the pivotable arm 26 to the collar 42 by means of rod 64. FIG. 5 also shows that when installed in a forage harvester, a panel 68 of the harvester separates the arm 26 from the tensioning rod 34, the two rods 64 and 65 passing through arcuate slots in the panel 68.

Figure 2:
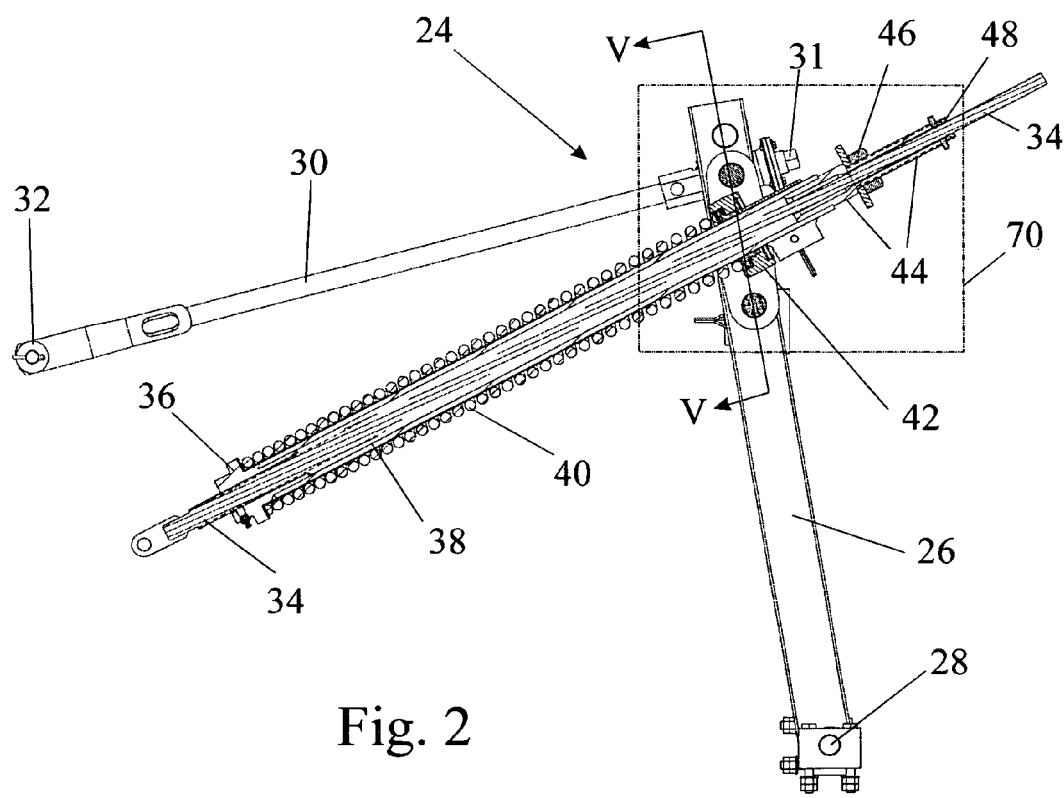
FIG. 2 is a section through the tensioning rod and spring of a belt tensioning system of the invention.

At the commencement of assembly, the tie bar 30, while connected to the pivot frame of the blower, is extended to its maximum length so that the arm 26 is rotated clockwise in FIG. 2. A pre-assembly comprising the tube 38, the collar 42, the first abutment 36, the insert 44, the nut with washer 46 and the spring 40, is next placed over the end of the tensioning rod 34 remote from the roller 22. The pre-assembly unit is screwed onto the tensioning rod 34 and secured by locknut 48. The length of the rod 34 projecting from the tube 38 is set so that the collar 42 aligns with the hole in the plate 62. The plate 60 is then bolted to the rods 64 and 65 to secure the collar 42 to the arm 26 and tie bar 30.

Next, the nut 31 is rotated to shorten the tie bar 30 and cause the arm 26 to pivot about the pin 28, in a counter clockwise direction as viewed in FIG. 2 thus moving the tensioning arm with collar 42 towards the belt 18. As the arm 26 pivots, the collar 42 slides over the outer surface of the tube 38 and compresses the spring 40 between itself and the first abutment 36 defined by the flange of the insert at the opposite end of the tube 38. The length of the tie bar 30 is chosen so that when the two parts of the tie bar are turned in completely and thus the tie bar is at its minimum length, the hexagonal head 44a of the insert 44 becomes accessible. Fully tensioning the belt 18 by the tensioning roller 22 is achieved by rotating the tube 38 relative to the tensioning rod 34. When the locknut 48 is loosened, the tube 38 may be turned by gripping the hexagonal head 44a thus moving the tensioning rod 34 with the tensioning roller towards the belt 18 while the tube 38 is being turned inside the threaded first abutment 36. After the correct setting has been achieved, the locknut 48 is tightened again to retain the setting.

Because the tie bar 30 is anchored to the pivot frame of the blower, the point 32 will move when the blower is repositioned and by suitable selection of the geometry of the tie bar 30 and the pivoting arm 26 it is possible to ensure that the belt tension will remain correctly set in both positions of the blower.

Removing the tensioning roller 22 from the belt 18 for any reason, can be done by only loosening nut 31 and varying the length of the tie bar 30. When the nut 31 is turned, the arm 26 will move clockwise around pin 28 thus moving the collar 42 because of their connections through rods 64 and 65. However, this turning of the nut 31 needs to be against the tension of the spring 40 and this entails a large effort. To simplify the task, a U-shaped spacer 80 (see FIGS. 4 and 6) can be slipped over the tube 38 to bridge a large part of the gap between the collar 42 and the stop but 46 before the nut 31 is undone. Only a limited distance over which the nut 31 needs to be turned against the force of the spring 40 remains. Once the spacer is firmly wedged between the stop nut 46 and the collar 42, undoing the nut is no longer against the force of the spring. When further undoing the nut 31, the complete tensioning system 24 will move away from the belt by rotating about pin 28 without changing the relative distance between the first abutment 36 and the collar 42.

Re-assembly then merely requires repositioning the tensioning roller 22 by turning the nut 31 and shortening the length of the tie bar 30. The complete tensioning system 24 will then move towards the belt. Only the last distance over which the tie bar 30 needs to be shortened will be against the force of the spring. Once the U-shaped spacer 80 is no longer wedged between the collar 42 and washer of the nut 46, the collar 42 will be moved towards the first abutment 36 together with the shortening tie bar 30. Once the tie bar 30 is again in its shortest position, the tensioning of the belt is complete. In this way, the tensioning system can be removed and replaced quickly and as long as the tie bar 30 is shortened to its original length, the tension setting will not be affected and will not require adjustment. When not in use, the U-shaped spaced 80 can be secured to the arm 26 in a storage position, as shown in FIGS. 3 and 5.

If the tensioning system 24 needs to be dismantled for any reason, it would be possible to reverse the above steps and to remove the pre-assembly unit from between the plates 60 and 62. The complete installation and tensioning the belt by the tensioning system needs to be done by using the variable tie bar 30 and the hexagon 44a.

The invention claimed is:

1. A tensioning system for a drive belt of a blower of a forage harvester, comprising a tensioning roller, a rod for moving the tensioning roller towards and away from the belt, a spring surrounding the rod and acting between a first abutment mounted on the rod and a second abutment connected to the chassis of the harvester to urge the roller towards the belt, wherein the second abutment connected to the chassis is carried by an arm that is movable relative to the chassis and anchored by means of a tie bar, wherein the tie bar is of adjustable length to enable the belt to be loosened by varying the length of the tie bar, wherein the end of the tie bar remote from the movable arm is secured to a pivot frame that serves to mount the blower on the chassis of the harvester, and wherein the geometry of the pivotable arm and the tie bar is selected to ensure that the drive belt is correctly tensioned in different operating positions of the blower.

2. A belt tensioning system as claimed in claim 1, wherein the movable arm carrying the second abutment is pivotably mounted on the chassis of the harvester.

3. A belt tensioning system as claimed in claim 1, wherein the first abutment on the tensioning rod is defined by a flange which is disposed within the spring and which surrounds and is in threaded engagement with the rod, the position of the first abutment being adjustable by rotating the flange relative to the tensioning rod.

4. A belt tensioning system as claimed in claim 3, wherein the second abutment is formed by a collar overdisposed on the outer surface of a tube that surrounds the tensioning rod and is releasably secured to the pivotable arm.

5. A belt tensioning system as claimed in claim 4, wherein a portion of the tube extending beyond the collar is externally screw threaded and engaged by a nut to enable the spring to be held in compression on the tube prior to the tube being fitted as a sub-assembly over the tensioning rod.

6. A belt tensioning system as claimed in claim 5, wherein the portion of the tube before the collar is shaped externally as a hexagon to enable the tube to be engaged by a spanner and allow adjustment of the tube relative to the rod to be effected from the end of the rod remote from the tensioning roller.

* * * * *